E. H. COTTRELL.
NEWSPAPER.
APPLICATION FILED JAN. 25, 1915.

1,341,633.

Patented June 1, 1920.

3 SHEETS—SHEET 1.

Witnesses:
Harry G. Fleischer
George Berry

Inventor:
Edgar H. Cottrell
by attorneys

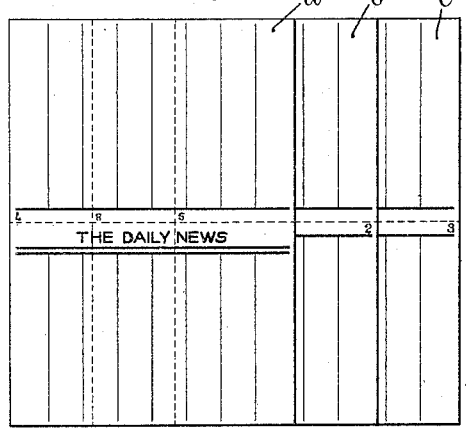
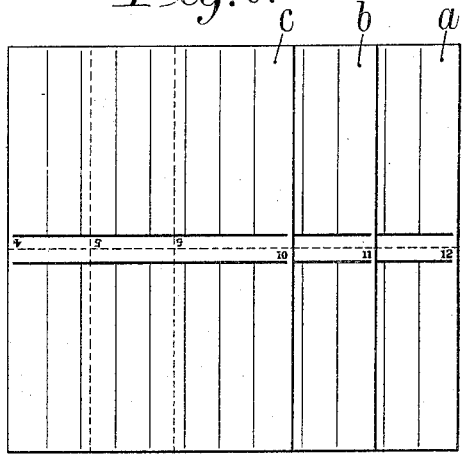
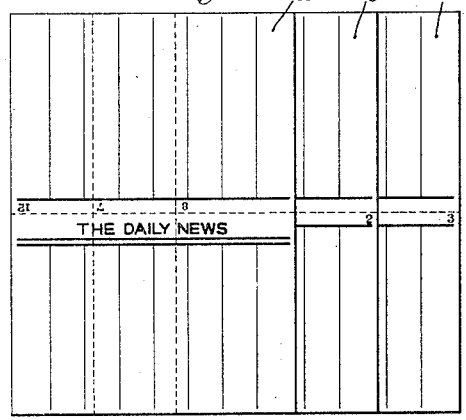
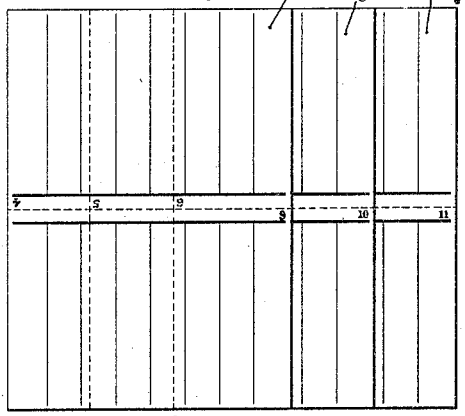
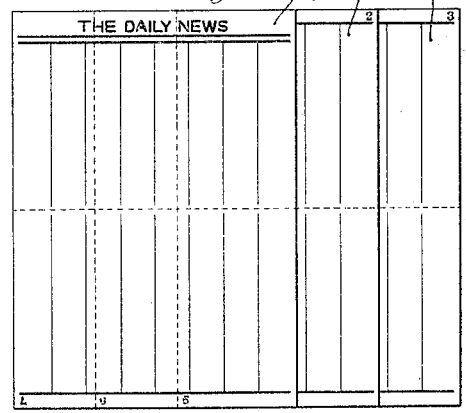
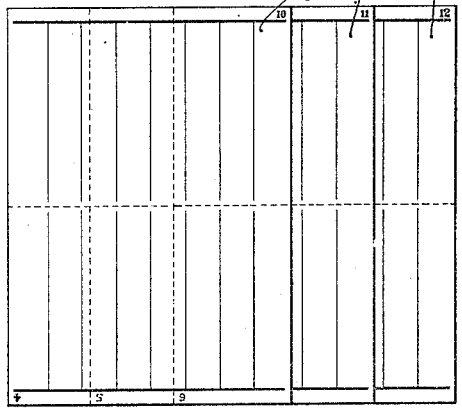

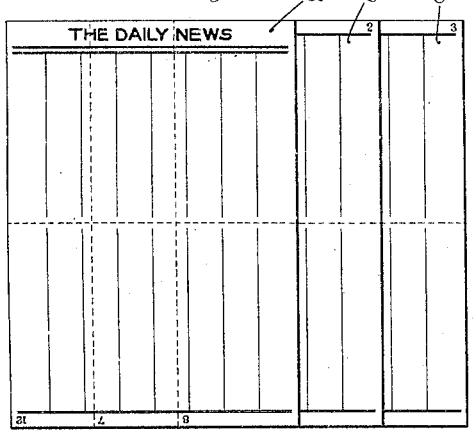
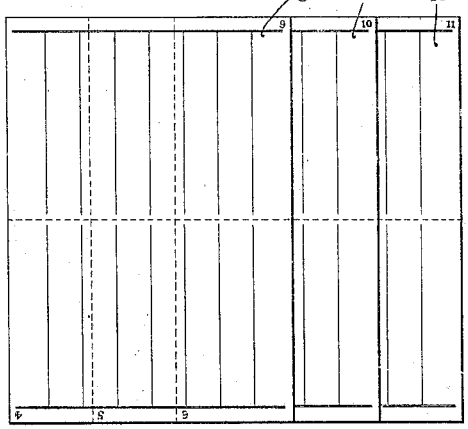

ately from sixteen to eighteen inches
UNITED STATES PATENT OFFICE.

EDGAR H. COTTRELL, OF WESTERLY, RHODE ISLAND.

NEWSPAPER.

1,341,633. Specification of Letters Patent. Patented June 1, 1920.

Application filed January 25, 1915. Serial No. 4,227.

*To all whom it may concern:*

Be it known that I, EDGAR H. COTTRELL, a citizen of the United States, and resident of Westerly, in the county of Washington and State of Rhode Island, have invented a new and useful Improvement in Newspapers, of which the following is a specification.

In newspapers as usually produced where the leaves bearing the printed pages are approximately from sixteen to eighteen inches wide and from twenty-one to twenty-three inches long, it is well known that because of the very large size of the leaves, the location of the fold and the usual poor quality of paper, it is extremely difficult to hold the newspaper in a proper position for perusal and it is also difficult to turn the leaves over without wrinkling and tearing the paper and without using an undue amount of room, which latter is very undesirable where crowded conditions prevail as in public conveyances, etc.

The object of my invention is to overcome the defects and disadvantages above enumerated, by producing a newspaper in which the sheets are folded transversely to the columns of printed matter so that the newspaper may be very easily held in a convenient position for reading and permitting the very ready turning of the leaves, the newspaper at all times being kept within a reasonable size for easy perusal and handling.

A further object is to so arrange the printed matter that each side of each sheet will bear two printed pages arranged to read in opposite directions; in some embodiments away from each other, and in other embodiments toward each other.

Practical embodiments are represented in the accompanying drawings, which illustrate a twelve-page newspaper having its sheets printed, assembled and folded according to my invention.

Figure 1:
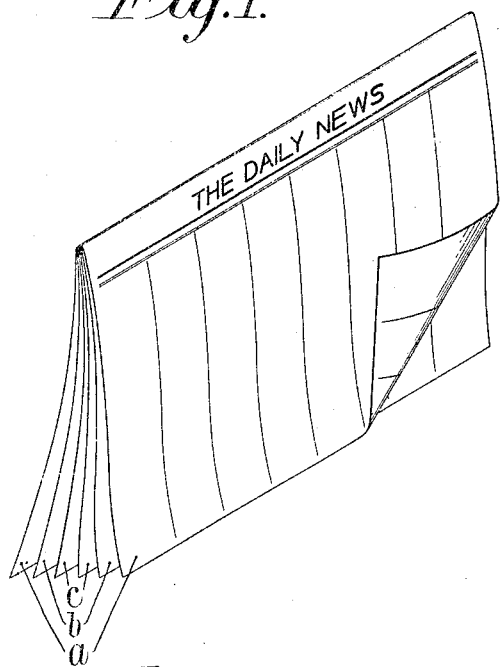
Figure 3:
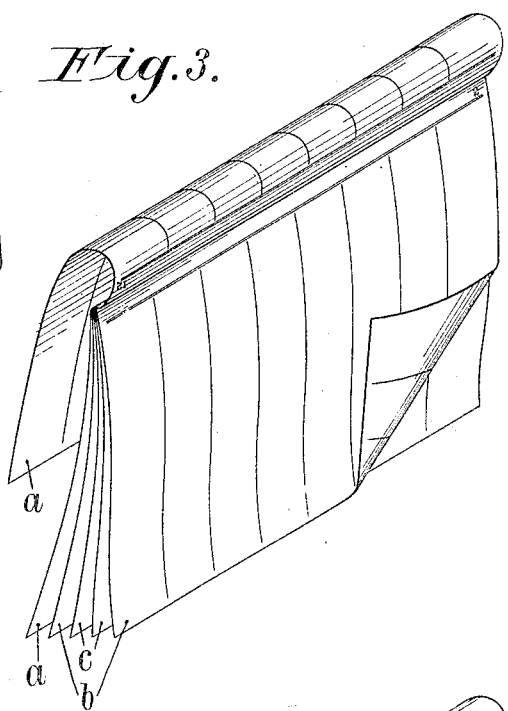
Figure 2:
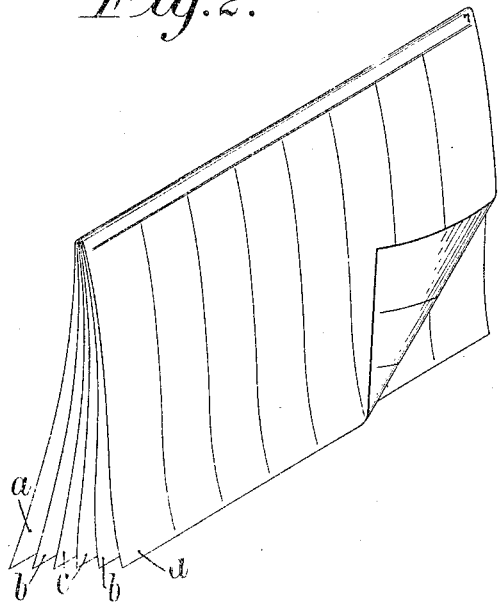
Figure 4:
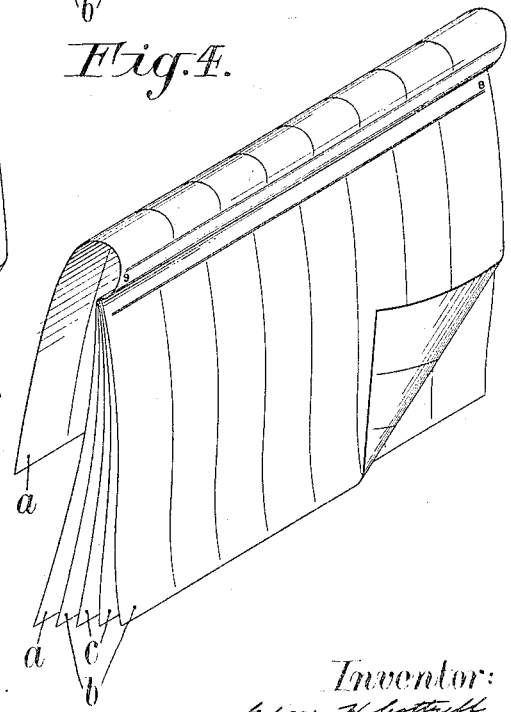

Figure 1 is a front view in perspective of a newspaper folded and printed according to one embodiment of my invention, Fig. 2 is a back view in perspective of the same, Fig. 3 is a front view in perspective with the first leaf turned over, Fig. 4 is a back view in perspective with the last leaf turned over, Figs. 5 and 6 are respectively front and back views on a smaller scale of the embodiment shown in Figs. 1 to 4 with the sheets unfolded and partly separated to show more clearly the page arrangement, Figs. 7 and 8 are similar views of another embodiment, Figs. 9 and 10 are similar views of a third embodiment, and Figs. 11 and 12 are similar views of a fourth embodiment.

The three sheets are denoted by $a$, $b$ and $c$, each of which sheets is provided with two printed pages on each side thereof, the pages on each side reading away from each other. The sheets are folded together transversely to the columns of reading matter along a line between the printed pages and are preferably secured together along said fold line.

In the embodiment of a twelve page newspaper, printed and arranged as in Figs. 1 to 6, the front sides of the sheets $a$, $b$ and $c$, contain the printed pages 1 and 7, 2 and 8, and 3 and 9; and the back sides of the said sheets contain the printed pages 6 and 12, 5 and 11, and 4 and 10.

In the embodiment shown in Figs. 7 and 8, the front sides of the sheets $a$, $b$ and $c$, contain the printed pages 1 and 12, 2 and 7, and 3 and 8; and the back sides of said sheets contain the printed pages 6 and 11, 5 and 10, and 4 and 9.

In the embodiment shown in Figs. 9 and 10, the front sides of the sheets $a$, $b$ and $c$, contain the printed pages 1 and 7, 2 and 8, and 3 and 9; and the back sides of said sheets contain the printed pages 12 and 6, 11 and 5, and 10 and 4.

In the embodiment shown in Figs. 11 and 12, the front sides of the sheets $a$, $b$ and $c$ contain the printed pages 1 and 12, 2 and 7, and 3 and 8; and the back sides of said sheets contain the printed pages 11 and 6, 10 and 5 and 9 and 4.

In the first two embodiments, the two pages on each side of each sheet read away from each other and in the last two embodiments the two pages on each side of each sheet read toward each other.

All these arrangements of the printed pages permit the pages, partway through the newspaper, to be perused by turning the leaves over successively in one direction. The paper may then be turned laterally and the remaining pages may be perused by turning the leaves over in the same direction as the first mentioned leaves. A newspaper is thereby produced which may be perused very conveniently and which may be kept at all times within a reasonable lateral compass and in which the newspaper may be readily perused by turning the leaves over so as to permit the leaves to fall readily by gravity into position to be easily grasped by the hands of the reader without any danger of wrinkling or tearing the newspaper.

By the term "newspaper" I wish to include all large products of an equivalent nature where the size of the product renders the same open to the disadvantages and defects enumerated if they were printed or folded as heretofore and in which such disadvantages and defects would be remedied by the printing and folding of the same in a manner substantially as herein shown and described.

It is obvious that the four embodiments herein shown and described are only a few of many embodiments which would be included by my invention; hence I do not wish to limit myself to the structures herein shown, but—

What I claim is:—

A newspaper comprising a plurality of sheets, each sheet having two printed pages on each side thereof, and a fold line between the pages, the columns of printed matter running at right angles to the fold line, the two printed pages on each side of each sheet reading in opposite directions to each other when the newspaper is unfolded.

In testimony that I claim the foregoing as my invention, I have signed my name in presence of two witnesses, this tenth day of November, 1914.

EDGAR H. COTTRELL.

Witnesses:
F. GEORGE BARRY,
C. S. SUNDGREN.